Figure 3:
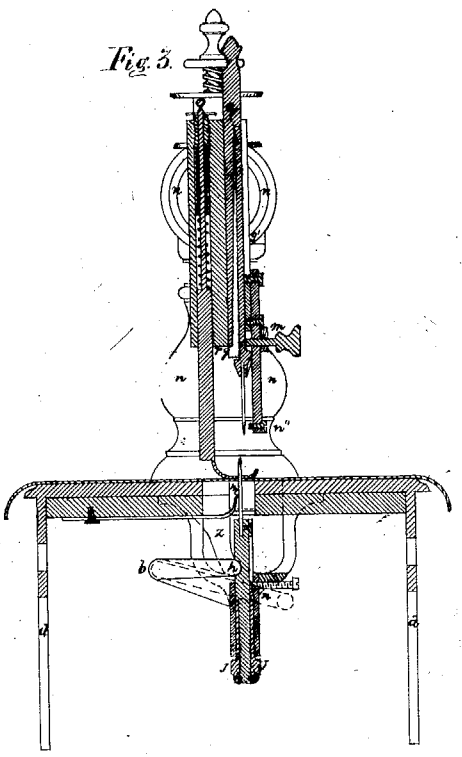

4 Sheets--Sheet 1.
A. F. JOHNSON.
Sewing-Machine.
No. 6,550. Reissued July 20, 1875.
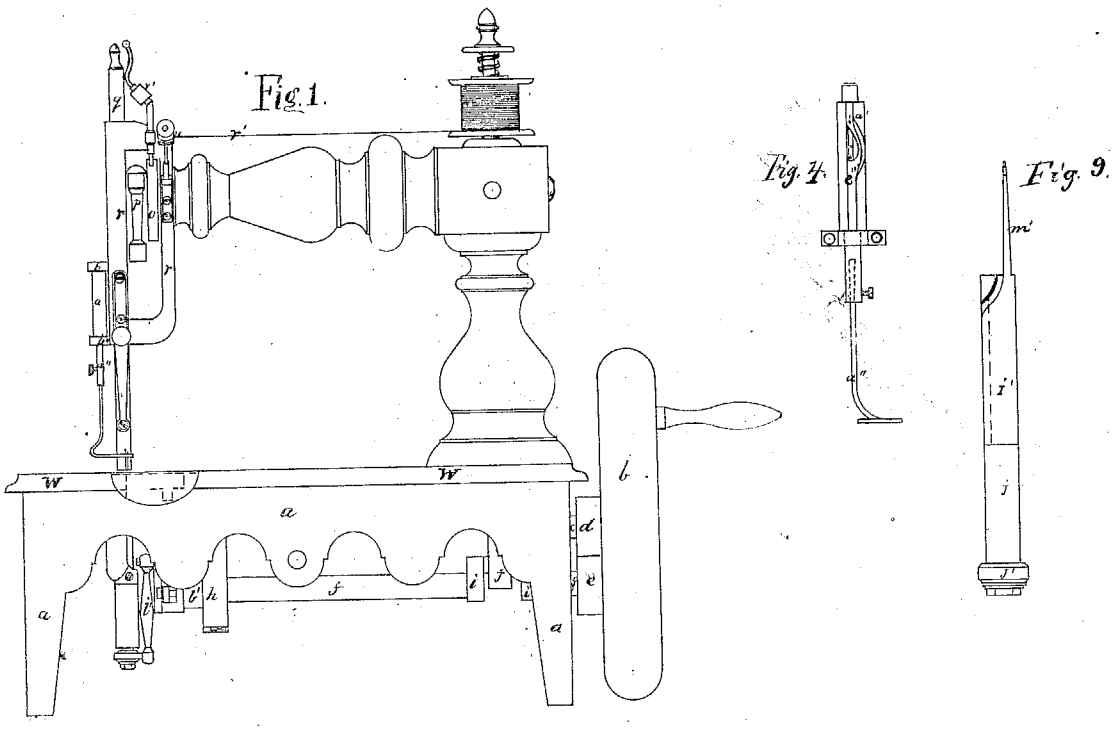
Witnesses:
George E. Phelps.
F. J. Hillman
Inventor:
Albert F. Johnson
by Alban Andrén. att.

A. F. JOHNSON.
Sewing-Machine.

No. 6,550.

Reissued July 20, 1875

Witnesses:
George E. Phelps.
N. J. Hillman

Inventor:
Albert F. Johnson
by Alban Andrew at

BEST AVAILABLE COPY

4 Sheets--Sheet 3.

A. F. JOHNSON.

Sewing-Machine.

No. 6,550.

Reissued July 20, 1875.

Witnesses:
George E. Phelps.
N. J. Hillman

Inventor:
Albert F. Johnson
by Allan Andrew. att.

4 Sheets--Sheet 4.
A. F. JOHNSON.
Sewing-Machine.
Reissued July 20, 1875.
No. 6,550.
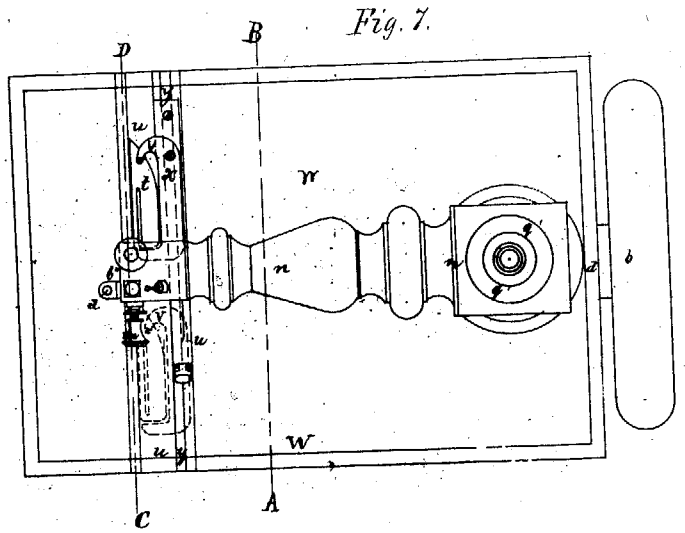
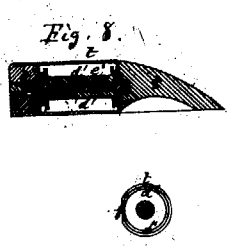
Witnesses:
George E. Phelps.
N. J. Hillman
Inventor:
Albert F. Johnson
by Alan Andrew, atty

UNITED STATES PATENT OFFICE

ALBERT F. JOHNSON, OF BOSTON, MASSACHUSETTS, ASSIGNOR, BY MESNE ASSIGNMENTS, TO SAMUEL T. THOMAS, OF SAME PLACE.

IMPROVEMENT IN SEWING-MACHINES.

Specification forming part of Letters Patent No 42,292, dated April 12, 1864; reissue No. 6,550, dated July 20, 1875; application filed August 12, 1874.

*To all whom it may concern:*

Be it known that ALBERT F. JOHNSON, of Boston, in the county of Suffolk and State of Massachusetts, invented certain new and useful Improvements in Sewing-Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The present invention relates partly to improvements in the method of producing a wax-thread seam for the uniting of heavy fabrics, like leather, such as are used for boots and shoes, harness, carriages &c., although it will apply essentially to the sewing of other materials as well when other threads are to be used.

The invention also relates to an improved mechanism for the operation of the awl and needle, consisting in the employment of a driving-shaft below the work-supporting plate for the operation of the needle, and a shaft above the work-supporting plate for the operation of the awl, the said shafts being connected by means of suitable intermediate mechanism. The advantage of a shaft above the work-supporting plate for the operation of the awl, over a rocking lever as formerly used, is, that the whole strain on the awl, when piercing the material, is conducted to the strong goose-neck of the machine, whereas, when a rocking lever is used, such a lever has to bear the whole strain, and, as it is generally hung at a great distance from the awl, it must be made unnecessarily heavy to prevent its breaking or bending when the awl enters the material, and it requires, consequently, more power to rock such a heavy and long lever than is required where a shaft is used for the same purpose, as is shown in my present invention.

Previous to entering into a detailed description of this invention, it may be well to show what, in the course of many experiments and investigations, have been found to be the difficulties to be overcome and the essential requisites to be embodied in a sewing-machine for producing this class of goods, as it will tend to point out more clearly the salient points of my invention, and wherein they differ from what has before been done.

The only wax-thread sewing machinery heretofore used that has approximated to the accomplishment of practical results has been that by which a single-thread or tambour stitch has been produced, it having been found impossible to form a seam by a double-thread or lock stitch in such heavy goods with a waxed or tarred thread, although it is evident, and has long been demonstrated, that this latter stitch is the only one which is sufficiently strong and durable to withstand the hard usage to which such fabrics are exposed. But the lock-stitch could not be made with a wax-thread in leather and other hard fabrics by the ordinary arrangement of devices heretofore used, for, among others, the following reasons, viz:

First, an eye-pointed needle cannot be used, on account of the chafing of the thread in its eye, which takes place both while passing through a hard material like leather, and giving the loop to the shuttle, and again while drawing through the eye of the needle to tighten up the slack loop through which the shuttle has just passed. This chafing of a wax-thread also would fill the eye of the needle with gum and lint, and render it inoperative.

Again, as an eye-pointed needle is necessarily grooved longitudinally, in order to permit the thread and needle to pass together through the goods, a waxed or tarred thread would stick in this groove and prevent the formation of a loop for the passage of the shuttle. Furthermore, an eye-pointed needle, to pass through very thick goods, such, for instance, as a thorough-brace used in carriages, would have to be so long as to be inoperative, because it is necessary, in using a wax-thread, to give a loop sufficiently large to pass around and allow the free passage of the shuttle, on account of the great friction that would otherwise be produced by the thread upon the same, and the impossibility of drawing the loop down through the goods by the passage simply of the shuttle, as is the case in the use of a dry thread. In the use of an eye-pointed needle, also, as it carries down with it a double thread or loop through the fabric, the loop and needle are liable to be wedged in the same, and this would be especially the case in sewing leather goods with a waxed thread. It has been attempted to obviate the difficulties experienced in the use of an eye-pointed needle by employing an awl for puncturing the leather, in combination with a hooked needle, which pulled the thread down through the same; but this has produced only a single-thread stitch. Moreover, the tightening of the stitch was necessarily performed by the hooked needle itself, and during the most of this operation the thread was unavoidably under full tension. Now, to draw a double waxed thread, under great tension, through such hard and heavy materials by means of the hooked needle will occasion such great friction as to prevent satisfactory results from being attained in sewing unyielding materials such as leather. In these machines, in which an awl and hooked needle are used, the tightening of the stitch is necessarily performed while the needle is in the goods, and the hooked needle has to draw the waxed thread double, or in a loop form, through the same. This causes so much friction as to render it nearly or quite impossible to use a shuttle under such circumstances, as the shuttle could hardly pass through a loop under such great strain while pulling the thread down through the goods, especially if they were non-elastic. After many practical tests then, it became desirable that the machinery for producing a double or lock stitch in leather, or other similar fabrics that are to be united with a waxed thread, should be subject to the following conditions: first, a substitute or substitutes for an eye-pointed needle which would be free from its defects, as herein above enumerated, for puncturing the hole through the fabric and carrying the thread through the same; second, that a shuttle, or other device for interlocking one thread with another, should be so combined with the other devices as to be free to pass through the loop of the needle-thread without strain or friction; third, the tightening of the stitch should be performed when the needle or other instrument is not in the goods with the waxed thread, and that while the thread is being passed down through the fabric it should be slack or without being subject to any tension during the whole time it is being so passed.

By these improvements in sewing-machines the above-named desiderata have been successfully accomplished. In lieu of an eye-pointed needle, a puncturing and an open-eyed hooked needle are employed, and with these is combined a shuttle for causing the formation of a lock-stitch.

To obviate the necessity of allowing the needle to remain in the fabric while the stitch is being tightened, which, as hereinbefore shown, is fatal to practical sewing with a waxed thread, an arrangement of devices or "take-up" is employed, which operates entirely independent of the movement of the needle, and in such a manner that while the thread is being conveyed through the fabric it shall be slack and subject to no tension.

In the accompanying plates of drawings these improvements in sewing-machines are represented.

Figure 5:
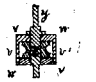
Figure 2:
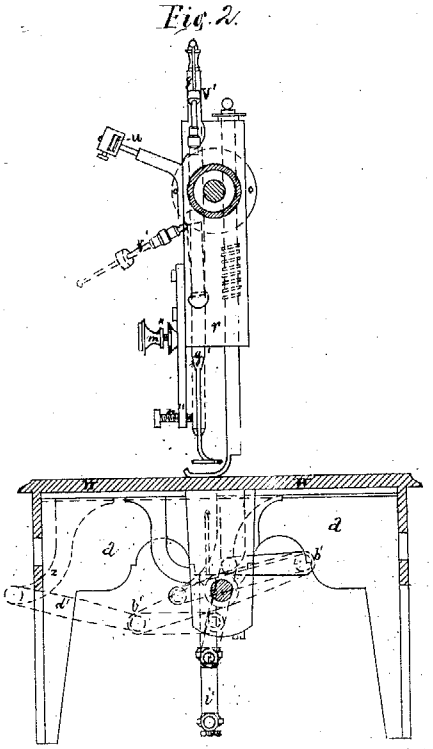
Figure 6:
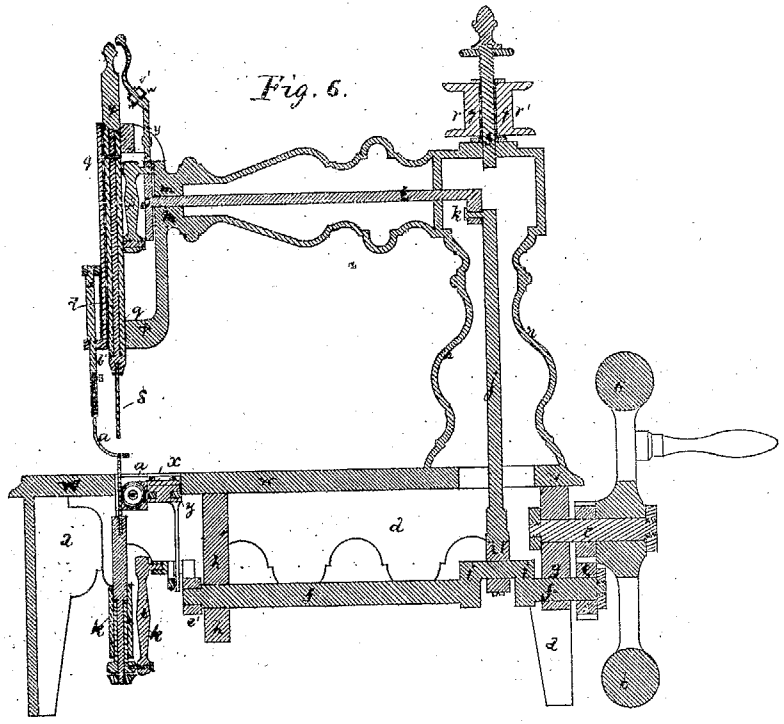

In Plate 1, Figure 1 is a side view of this improved sewing-machine. Fig. 2 is a transverse vertical section taken through the plane of the line A B, Fig. 7, Plate 2. Fig. 3 is a transverse vertical section taken through the plane of the line C D, Fig. 7, Plate 2. Figs. 4, 5, and 9 are detail views, which will be hereinafter more particularly referred to. In Plate 2, Fig. 6 is a central longitudinal vertical section. Fig. 7 is a plan or top view, and Figs. 8 and 9 detail views of the shuttle of the machine.

*a a* in the accompanying drawings represent the frame-work of the machine; *b b*, the driving-wheel, turning upon a horizontal shaft, *c*, of the frame-work *a*. Attached to the driving-wheel *b*, and revolving with it, is a gear-wheel, *d*, engaging with a similar gear, *e*, on a horizontal shaft, *f*, having bearings at *g* in the frame-work *a*, and in a projection, *h*, of the same. Near one end of the shaft *f*, and forming a part of the same, is a crank, *i*, to which is connected a rod or pitman, *j*, the upper end of the same being secured to the arm or crank *k* on one end of the horizontal shaft *l*, located in suitable bearings *m m* above the work-supporting plate in the goose-neck *n* of the machine.

At one end of the horizontal shaft *l* is a crank-disk, *o*, to one side of which the upper end of a short connecting-rod, *p*, is secured, the other end of the same being fastened to the vertical awl-bar *q*, moving in suitable bearings of the vertical arm *r*, the awl *s* being arranged in a vertical position at the lower end of the said bar *q*, in a manner which will hereinafter be described.

The above arrangement of devices is for operating and moving the awl up and down in a vertical plane for puncturing the fabric to be sewed, the operation of which, in connection with the other parts of the machine, will be hereafter explained.

*t t* is the shuttle, moving in a horizontal groove or way, *u*, of the platform *w*, and below its upper surface.

At each end of the shuttle *t t*, and abutting against the same, are two projecting arms, *v v*, of the horizontal plate X, that is guided by a groove, *y*, in the platform *w*. To the under side of the plate *x* the upper end of a curved arm, *z*, is secured, the other end, by means of a connecting-rod, *a'*, being attached to and receiving motion from the outer end *b*, of a crank or arm, *c'*, on the main shaft *f*, before referred to. The devices thus arranged and connected with the driving-wheel serve to impart at the proper times the desired reciprocating movement to the shutter, to be presently specified. Placed longitudinally within and in the center of the shuttle *t t* is a spool, *d'*, turning on a shaft, *e'*. Wound on this spool is the thread or other material used, the thread passing out of the said shuttle through the opening *f'* in the periphery thereof, (see Fig. 7, Plate 2,) and then laid along the groove *g'* of the same, in its proper position. *h'* is a crank attached to the crank-arm *c'*, before referred to, and to a connecting-rod, *i'*, the other end being secured to the lower portion of the vertical needle-shaft *j'*. This needle-shaft moves in bearings *k'*, and within the same is another shaft, *l'*, in the upper end of which, and eccentric therewith, (see Fig. 9,) the needle *m'* is inserted. In the periphery of the shaft *l'* is a vertical slot, *n'*, straight to the point *o'*, but then passing spirally around the said shaft for about one-third of its periphery, (see Fig. 9,) in which groove bears a stud, *p'*, of the bearings *k' k'*.

By the above arrangement, as the driving-shaft revolves, an up-and-down movement is given to the needle, and its shaft is also caused to partially rotate, for purposes and in a manner to be hereinafter set forth.

*q'* is a spool, around which is wound the thread *r'*, and which turns on a spindle, *s'*, fastened in the standard *n'*. This thread is then passed from the said spool to and around the guiding-pulley *w'* of the standard *t'*; thence through the opening *v'' v''* of the swivel-box V', turning on a shaft, *x'*, and around a pulley, *w'*, within said box *v'*, the shaft X' being a prolongation of the vibrating arm *y'*, secured rigidly to the crank *o*, before referred to, which arm, by its reciprocating motion, in connection with the box *v'* and pulley *w'*, slackens and tightens the threads, in forming the stitch, in a peculiar and novel manner, to be hereafter explained. Thence, from the pulley *w'*, it is passed to and through the openings or eye *z'* of the curved thread-carrier *a''*, with bearings at *b'' b''*. This eye *z'* is placed a little below the horizontal plane of the hook *c'* of the needle *m* when at its highest position, (see Fig. 1,) and is also made to partially revolve in a horizontal plane around the needle by means of the stud *d''* of the awl-bar *g*, traveling in the curved slot *e''* in said thread-carrier *a''*.

Having thus in detail specified the arrangements of the various parts comprising the machine and their connection with the driving-wheel, I will now proceed to explain the general manner in which the same operate to form the stitch in the fabric to be sewed.

The fabric to be sewed having been placed in its proper position on the platform, and the two threads arranged in the manner specified, the driving-wheel then being turned, the awl *s*, by means of the connecting devices before described, descends, puncturing the fabric, and at the same time feeding it along, by an arrangement of devices to be presently explained, till the aperture thus made is in the proper position for the needle to pass through the same in its upward movement. While the awl is thus descending, the needle also descends by means of the connecting devices before described, and passes down through the aperture made in the fabric by the previous descent of the awl, carrying with it the thread *r'*, which had been first placed around and within its hook *c'*, by means of the thread-carrier *a''*, arranged and operating as specified. This needle continues to descend until it has passed entirely through the fabric, when, by means of the groove *n'* and the stud *p'*, the needle is made to revolve, making about a third of a revolution, for the purpose of bringing the loop formed by its hook and carried through the fabric in the path of the shuttle.

During the downward movements of both the awl and the needle the shuttle *t t* travels in its guiding-way across the machine to the position indicated by dotted lines in Fig. 7, Plate 2, when, as the needle and awl commence to ascend, it moves forward, passing through the loop of the thread left in its path by the hooked needle. This movement of the shuttle continues until the awl and needle have both reached their uppermost position, the needle having passed upward through the aperture just punctured by the awl. The needle and awl then again descend, and the movements above described take place as before; but in order to tighten the loop carried through the fabric by the hooked needle, and interlock with it the shuttle-thread, I have provided the arrangement of devices, as hereinbefore specified, consisting of the vibratory arm *y'*, swivel-box *v'*, and pulley *w'*. The operation of these, in connection with the movements of the needle and awl, is as follows: As they are descending the vibratory arm moves from its upper position, indicated in black lines in Fig. 2, to the position indicated in dotted lines in said figure, drawing the thread from the spool, and feeding it along in a slack condition to the needle; but as they ascend the arm travels back to its original position, and so on until the machine is stopped. By this forward and backward movement of the arm, it will be observed that during the whole time occupied by the needle in its descent the arm is drawing the thread from the spool and feeding it to the needle, thereby keeping the thread always slack while being pulled through the fabric; but that as the needle ascends the arm then, by traveling back to its starting-point, draws up and tightens the loop in the fabric, the importance of both of which in the sewing of leather fabrics, like boots, shoes, harness, &c., have been hereinbefore particularly set forth. To obviate the liability of the thread being detached from the pulley of the vibrating arm as it moves back and forth, I have inclosed the same within the box *v'*, which box swivels on its shaft, and thus prevents friction of the thread in the apertures *v'' v''*. *g''* is a rod hung on a pivot, *h''*, of the awl-bar.

In the lower end of the rod *g''* is the awl *s*, before referred to. *e''* is a spring, which bears against the rod $g''$, and as the awl descends throws it away from the line of travel of the needle, its length of motion being regulated by the set screw $m''$. $n''$ is another adjustable screw, placed in a lower plane than the screw $m,''$ and which bears against the inclined surface $o''$ of the rod $g''$ as it passes down by the same. These two screws are so adjusted with regard to each other that while the first will allow of the swinging movement of the awl-arm $g''$, as described, the other will cause said arm to be gradually brought back to its original position, thereby at the same time feeding along the fabric to the hooked needle, as is evident without further description. This swinging movement of the awl takes place as it descends, and it is obvious that the awl can be so operated upon by the proper adjustment of the set-screws as to vary the length of the stitch as may be desired. It is not necessary that the under thread should be carried by a shuttle, and so passed through the loop of the upper thread, but the same result may be accomplished by passing the loop of the upper thread over or around the under thread; but I have preferred the former mode for present purposes. The same result may be arrived at by using the hook or crochet-needle as the piercing instrument, and feeding the fabric by that or by other feeding devices; but the method I have described is better for most, if not for all, purposes, especially when the fabric is stiff and unyielding.

Having thus described the invention, I shall state my claims as follows:

What is claimed in this invention, and desired to be secured by Letters Patent, is—

1. The combination of an awl or other device for puncturing the fabric, an open-eyed or hooked needle for seizing and pulling the thread through the fabric, and a shuttle for interlocking one thread with another, the whole operating together substantially as described.

2. The combination of an awl or perforating device, open-eye or hook needle, shuttle, and the take-up mechanism, as and for the purpose herein set forth and described.

3. In combination with the rocker-shaft $l$ and vibrating arm, the guide-pulley $u'$ and pulley $u$, the whole forming a take-up, substantially as described.

4. In combination with the awl-bar, provided with a swinging arm for holding the awl, the adjusting-screws $m$ $n$ and their supporting-arm, as and for the purpose herein set forth and described.

5. In combination with a rocker-shaft above the work-plate, the awl-bar and thread-guide, as and for the purpose set forth.

6. A shaft arranged above the work-plate for the operation of the awl, in combination with a shaft below the table for the operation of the needle, and suitable connecting mechanism, as and for the purpose set forth.

In testimony that I claim the foregoing, I have hereunto set my hand this 3d day of February, 1874.

SAMUEL T. THOMAS.

Witnesses:
ALBAN ANDRÉN,
GEORGE E. PHELPS.